Sept. 4, 1956  S. BECKWITH  2,761,987
DISK SPRING FOR STATOR CORE
Filed Jan. 12, 1955  2 Sheets-Sheet 1

Inventor
Sterling Beckwith
by T. Lloyd La Fave
Attorney

Sept. 4, 1956  S. BECKWITH  2,761,987
DISK SPRING FOR STATOR CORE
Filed Jan. 12, 1955  2 Sheets-Sheet 2
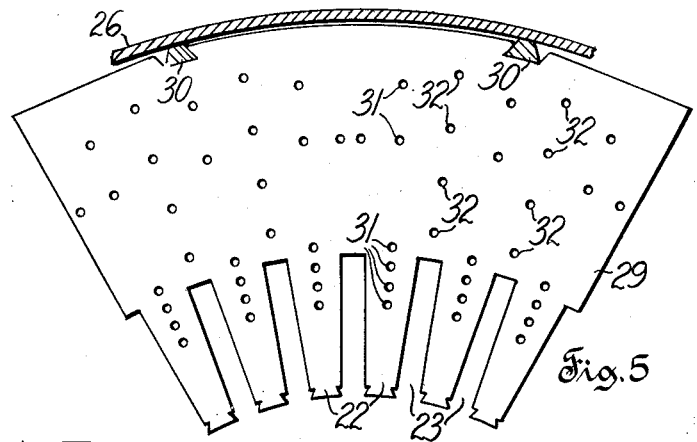
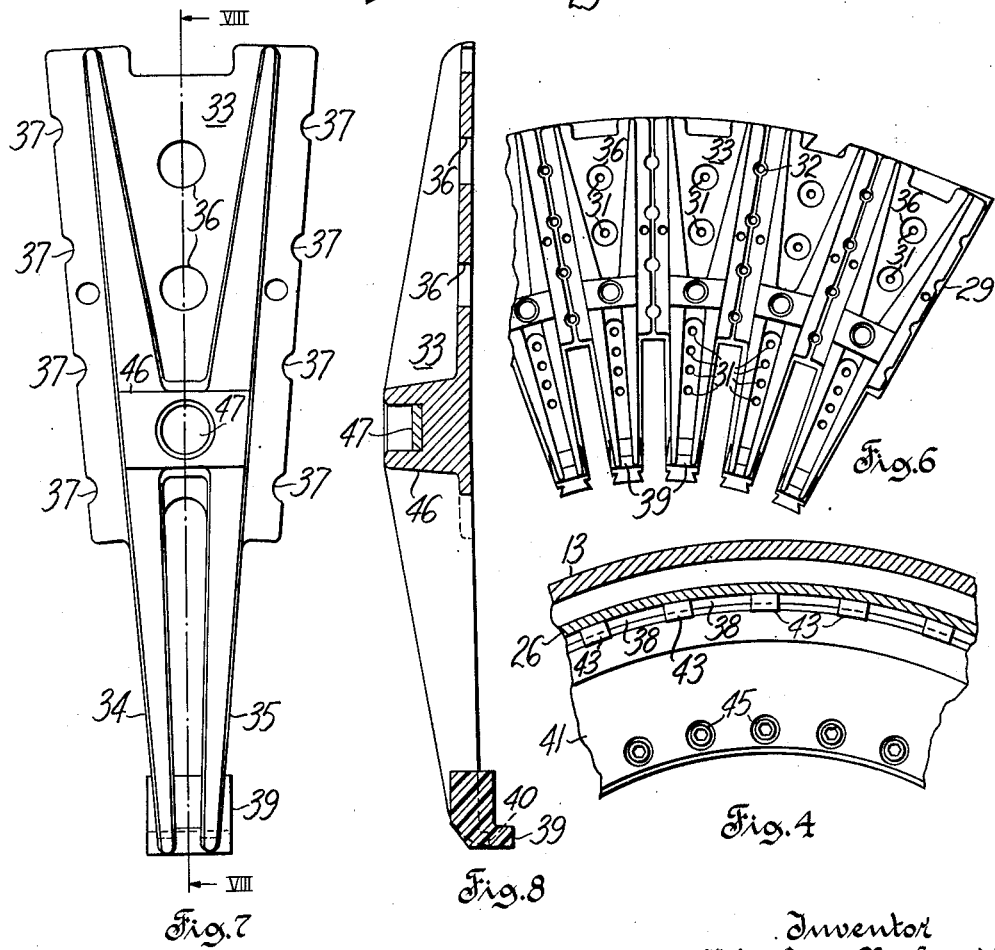
Inventor
Sterling Beckwith
by T. Lloyd LaFave
Attorney

United States Patent Office 2,761,987
Patented Sept. 4, 1956

2,761,987
DISK SPRING FOR STATOR CORE

Sterling Beckwith, Lake Forest, Ill., assignor to Allis-Chalmers Manufacturing Company, Milwaukee, Wis.

Application January 12, 1955, Serial No. 481,354

6 Claims. (Cl. 310—258)

This invention relates generally to a dynamoelectric machine and more particularly to a stator core secured by disk spring rings.

In a large dynamoelectric machine, such as a hydrogen cooled turbogenerator, as heretofore constructed, the stator core is secured in a framework between rigid end plates drawn together by core bolts which require tightening with seasoning of the core. The end plates may protrude radially beyond the core and necessitate spacing of the wrapper yoke from the stator core.

According to the present invention stator core laminations are stacked within the wrapper yoke and spaced from the wrapper with only stacking clearance therebetween. The core laminations are drawn together without use of any through bolts and the clamping structure has substantially the same outer diameter as the stator core. The absence of construction members between the core and inner wrapper enables a small diameter yoke to be used. The clamping pressure is provided by massive disk spring rings which are sufficiently deflected in assembly to take up all contraction of the stator core due to thermal seasoning and continue to maintain clamping pressure without any subsequent adjustment. Finger plates transmit the clamping pressure uniformly to the faces of the laminations. A flux shield is disposed in the access space formerly provided for tightening core bolts to prevent eddy current heating of the disk springs.

It is therefore an object of this invention to provide a dynamoelectric machine with a stator core constructed and arranged therein to permit reduction of the outer diameter of the machine.

Another object of the invention is to axially secure a relatively long stator core in a stator yoke without bolts extending axially through the core or behind the core.

Another object of the invention is to provide finger plates which transmit uniform pressure to the teeth of the laminations.

Another object of the invention is to axially secure a relatively long stator core under relatively constant core pressure independent of variations in core length due to thermal seasoning and thermal expansion.

Another object of the invention is to secure a stator core by a disk spring shielded from stray field flux.

Other objects and advantages will be apparent from a consideration of the following description taken in connection with the accompanying drawings having views drawn to different scales in which:

Fig. 4 is a sectional view taken along the line IV—IV of Fig. 3;

Fig. 5 shows a segment of a lamination of the stator core of the machine of Fig. 1;

Fig. 6 shows end head clamping fingers disposed on a stator core segment;

Fig. 7 shows an enlarged view of a clamping finger shown in Fig. 6; and

Fig. 8 is a sectional view taken along line VIII—VIII of Fig. 7.

Figure 1:
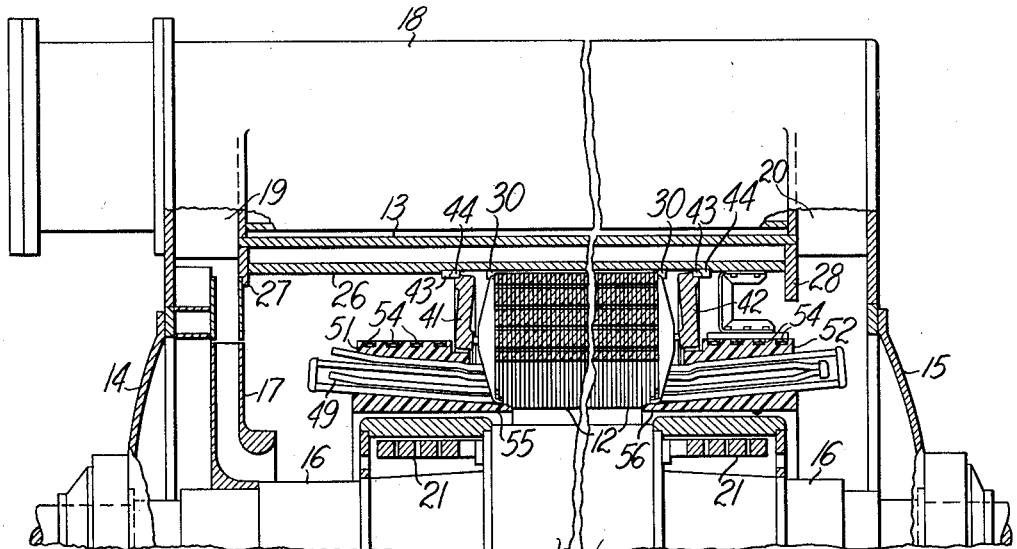
Fig. 1 is a view in interrupted longitudinal cross section of portions of a dynamoelectric machine embodying the present invention.

Referring to the drawing, the dynamoelectric machine shown in Fig. 1 is a turbogenerator comprising a rotor 11 and a stator 12 enclosed by a housing normally fillable with hydrogen ventilating gas. The housing includes an outer cylindrical wrapper 13 secured to end bells 14, 15.

A rotatable shaft 16 extends through end bells 14, 15, preferably in gas tight relation therewith and is supported in bearings not shown. A high pressure centrifugal blower 17 is mounted on shaft 16 adjacent end bell 14 for circulating ventilating gas through a suitable cooler 18 and through axial ventilating passages in the rotor 11 and stator 12. Cooler 18 is disposed outside of wrapper 13 and secured thereto longitudinally of the housing. An inlet 19 to cooler 18 is provided from the discharge of the blower and an outlet 20 at the other end of the cooler opens into the other end of the machine housing remote from the blower.

Rotor 11 comprises a cylindrical slotted magnetic core preferably integral with shaft 16 and provided with a field winding 21. The conductors forming the rotor winding are constructed and arranged in the slots of the rotor core to provide ventilating ducts axially through the rotor core bringing ventilating gas in direct contact with the metal of the rotor conductors.

Stator 12 comprises a cylindrical laminated slotted core disposed coaxially of rotor 11 and supported by a frame. This frame preferably comprises a cylindrical wrapper 26 disposed coaxially within outer wrapper 13 and secured only at opposite ends to rigid end plates 27, 28 integral with wrapper 13.

The stator core is made up of slotted laminations 29 (Fig. 5) stacked in a well known manner on longitudinally extending bars 30 which are secured to the inner wrapper 26. At least one of the laminations or a suitable baffle is disposed in abutment with the wrapper 26 to prevent axial flow of ventilating gas between wrapper 26 and the stator core. The core laminations are subject to yielding upon seasoning of the core which causes shortening of the length of the core due to taking up of minute irregularities in the laminations and flattening of minute varnish peaks under heat and pressure. The core laminations 29 have axially aligned openings of relatively small size to provide axial ventilating passages through the teeth 22 of the core and through the body of the core back of the teeth. As shown a plurality of such openings 31 lie in a line extending radially through each tooth and similarly a plurality of such openings 32 lie in a line extending radially through each winding slot 23.

Means clamping and confining the stator core laminations together under a predetermined axial pressure include finger plates 33 of nonmagnetic material preferably corresponding in number to the number of stator teeth, and radially disposed side by side on the end laminations of the core. Each finger plate 33 has a forked end defining fingers 34, 35 which bear against core teeth 22 on opposite sides of openings 31. Openings such as drilled holes 36 in the finger plates are aligned with openings 31 in the laminations.

The sides of the finger plates are similarly notched so that the notches 37 of adjacent finger plates define openings in alignment with the openings 32 in the core laminations.

The tooth portions of end laminations of the stator core are stepped to reduce eddy current losses due to flux entering the sides of the laminations. Blocks 39 of nonconductive and nonmagnetic material are stepped to correspond to the laminations and disposed against each end tooth of the stator core. Blocks 39 are secured in position by the clamping pressure exerted thereon by the fingers of finger plates 33. Fingers 34, 35 have tips 40 which extend axially inward against a stepped face of blocks 39.

Disk spring rings 41, 42 apply axial pressure on each finger plate at a point substantially midway between its ends. Disk springs 41, 42 are heavy steel rings dished as indicated by spring disk 41 shown in Fig. 2 before deflection. A plurality of keys 43, 44 are circumferentially spaced in an annular keyway in inner wrapper 26 at each end of the stator core. The space 38 between adjacent keys provides stator core ventilating gas to pass the spring disk. Each key 44 overlies a portion of a key 43, and a shoulder in spring disk 41 overlies keys 44 to lock the keys in the keyway. Keys 44 abut the face of the shoulder in disk 41 and thus secure the radially outer end of the disk against axial movement away from the stator core. Spring disk 42 is similarly secured by keys 43, 44 in another annular keyway adjacent the other end of the stator core.

Figure 2:
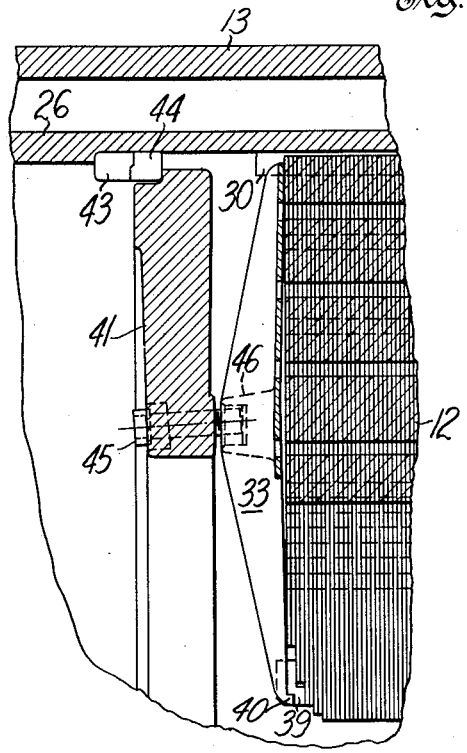
Fig. 2 is an enlarged view of an end head portion of the stator core of the machine of Fig. 1 during assembly.

The clamping pressure of disk springs 41, 42 is transmitted to the finger plates 33 through separately adjustable means shown as socket head screws 45 uniformly spaced circumferentially about the radially inner portion of the disk spring. Each screw 45 is disposed in threaded engagement with the disk spring with an end of the screw seated in a cup shaped boss 46 in a finger plate about midway between the ends of the finger plate. The cup shaped boss has a steel washer 47 embedded therein to provide a wear resistant seat for the screw. The axes of screws 45 are normal to the stator core when the disk is stressed or deflected as in assembled position shown in Fig. 3 and indicated by the fact that the screw axes are parallel to the axis of the machine. Each screw is therefore inclined slightly to the axis of the machine when the disk springs are in nondeflected position as indicated in Fig. 2.

Figure 3:
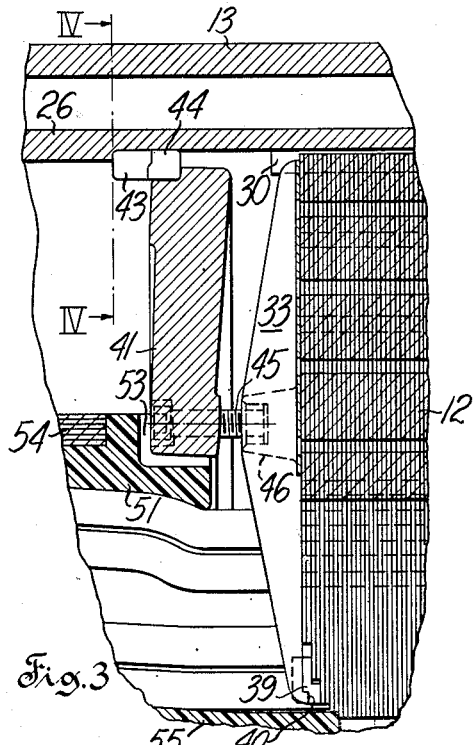
Fig. 3 is an enlarged view of an end head portion of the assembled stator of the machine of Fig. 1 showing deflection in the disk spring.

In assembly of the stator core, the laminations are stacked upon one disk spring 41 and associated finger plates and other finger plates are then disposed on the stacked laminations and disk 42 is forced into place by suitable means such as hydraulic jacks. Spring disks 41, 42 have a radially outer portions secured in wrapper 26 by keys 43, 44 under stress causing a predetermined deflection of the disk springs within their elastic limits, as shown in Fig. 3, for applying pressure against the ends of the stator core. The deflection of the disk springs is substantially greater than the shortening or yielding of the core laminations upon thermal seasoning to secure a continuous core pressure independent of variations in core length due to such seasoning or other thermal changes. The spring gradient provides a relatively high continuous pressure on the core, which core pressure cannot be continuously maintained by core bolts. The cross section of the spring is tapered or shaped to give more uniform stress and permit greater deflection for a given strength material. Tightening or loosening a screw 45 varies the pressure exerted by the spring disk upon one finger plate, and screws 45 thus provide means to vary the clamping pressure on one finger plate relative to the pressure on another finger plate to provide distribution of spring pressure to assure maximum uniformity of core pressure on the core teeth. Adjustment of screws also takes up variations in thickness of core laminations due to manufacturing tolerances as represented by a crown in each lamination due to the rolling process.

An armature winding 49 disposed in slots of the stator core comprises conductors constructed and arranged to provide axial ventilating passages in the core slots bringing ventilating gas in substantially direct contact with the conductors. A tube 51, of nonconductive and nonmagnetic material, preferably made of a molded or laminated heat resistant material, is disposed about the end turns of the stator winding. Tube 51 abuts spring disk 41 and has scallops therein to provide passages 53 between the spring disk and the tube to permit free flow of ventilating gas therethrough for ventilating gas passing through the stator core.

Since spring disk 41 is a large mass of metal in the path of end stray field flux, it is protected from heating due to eddy currents. A magnetic path of low reluctance is provided for the stray field flux. This low reluctance path is provided by annuli 54 which are axially spaced cores formed by spirally wound laminations embedded in tube 51. The annuli 54 provide a laminated magnetic path between magnetic poles for flux set up through the stator coil ends which would otherwise go to the spring disk 41 and the stator yoke. The magnetic shield provided by annuli 54 also tends to increase leakage flux through the coil ends, especially for a two pole machine, and this better limits short circuit currents. A tube 52, like tube 51, is disposed about the end turns adjacent spring disk 42 and also has annuli 54 embedded therein to provide magnetic shielding for spring disk 42 and the stator yoke.

Tubes 55, 56, preferably of the same material as tubes 51, 52, are disposed coaxially of the stator core, at opposite ends thereof, within the cylinder defined by the end turns of the stator winding. Tubes 55, 56 are forced axially inward to abut core laminations extending radially inward beyond the finger plates. Tubes 55, 56 when forced into position confine the end turns rigidly between tubes 51 and 55 and between tubes 52 and 56.

In operation of the machine ventilating gas discharged from blower 17 circulates through cooler 18 to the right end of the machine, thence in parallel paths axially through the rotor passages and axially through the stator passages back to the blower. Besides ventilating gas flowing through winding slots for directly cooling stator conductors, ventilating gas also flows through passages in the iron of the core by passing through passages 53 in tubes 51 and 52 and through spaces 38 between keys. In the machine described the stator current capacity has been increased and the resulting losses in the coil end increased. According to this invention the spring disks which secure the core do not require adjustment even after thermal seasoning of the core, and such disks are protected from excessive heating due to coil end losses.

Although but one embodiment of the present invention has been shown and described, it will be apparent to one skilled in the art that various changes and modifications may be made therein without departing from the spirit of the invention or the scope of the appended claims.

It is claimed and desired to secure by Letters Patent:

1. A dynamoelectric machine comprising a frame, a stator core including laminations stacked in said frame, the length of said core subject to shortening upon seasoning of said core, and means axially clamping said laminations together comprising a disk spring secured in said frame at one end of said core and another disk spring secured in said frame at the other end of said core, said disk springs applying a pressure against the ends of said core, said disk springs having a deflection substantially greater than said shortening for applying a continuous pressure to said cores.

2. A dynamoelectric machine comprising a frame, a stacking core including laminations stacked in said frame, the length of said core subject to shortening upon seasoning of said core, said core having teeth defining winding receiving slots therebetween, nonmagnetic finger plates disposed on an end of said core extending radially from a tooth of the core toward the radially outer periphery of the core, and means clamping said finger plates against an end of said core comprising a disk spring having a radially outer portion secured in said frame causing a predetermined deflection of said disk spring in assembly of said core, circumferentially spaced screws disposed axially through said disk spring with said screws abutting said finger plates and providing means to vary the clamping pressure said disk spring applies to one said finger plate, the deflection of said spring disk being substantially greater than said shortening of said core for maintaining a continuous clamping pressure upon said end of said core.

3. A dynamoelectric machine comprising a frame, a stator core including laminations stacked in said frame, the length of said core subject to shortening upon seasoning of said core, said core having teeth defining winding receiving slots therebetween, nonmagnetic finger plates disposed on an end of said core with each finger plate extending radially from a tooth of the core to the radially outer periphery of the core, and means clamping said finger plates against an end of said core comprising a disk spring having a radially outer portion secured in said frame causing a predetermined deflection of said disk spring in assembly of said core, circumferentially spaced screws disposed axially through the radially inner portion of said disk spring with each of said screws abutting a corresponding one of said finger plates and providing means to vary the clamping pressure said disk spring applies to one said finger plate relative to another said finger plate, the deflection of said spring disk being substantially greater than said shortening of said core for maintaining a continuous clamping pressure upon said end of said core.

4. A dynamoelectric machine comprising a frame, a stator core including laminations stacked in said frame, the length of said core subject to shortening upon seasoning of said core and provided with an axially extending winding, a disk spring secured in said frame applying a pressure against an end of said core to cause said shortening of said core upon seasoning while maintaining a clamping pressure upon said core, a tube of nonconductive nonmagnetic material disposed about the end turns of said winding at said one end of said core, and a plurality of axially spaced annuli each comprising a laminated core embedded in said tube to provide a magnetic shield preventing flux from said end turns entering said spring disk.

5. A dynamoelectric machine comprising a frame, a stator core including laminations stacked in said frame, the length of said core subject to shortening upon seasoning of said core, said core having teeth defining winding receiving slots therebetween, nonmagnetic finger plates disposed on an end of said core extending radially from substantially the radially inner periphery of a tooth to substantially the radially outer periphery of said core, and means clamping said finger plates against an end of said core comprising a disk spring having a radially outer portion secured in said frame and a radially inner portion connected to each of said finger plates substantially midway between the ends of said finger plates to cause deflection of said disk spring in assembly of said core substantially greater than said shortening of said core for maintaining a continuous clamping pressure upon said end of said core.

6. The combination according to claim 5, wherein said means clamping said finger plates against an end of said core includes adjustable means coacting between said spring disk and individual said finger plates substantially midway between the ends of said finger plates to cause a predetermined deflection of said disk spring in assembly of said core substantially greater than said shortening of said core for maintaining a continuous clamping pressure upon said end of said core.

References Cited in the file of this patent

UNITED STATES PATENTS 2,399,352     Jones  ---------------- Apr. 30, 1946